Patented Dec. 30, 1947

2,433,439

UNITED STATES PATENT OFFICE 2,433,439

PYRIMIDINE COMPOUNDS

Francis Henry Swinden Curd, Clifford Gordon Raison, and Francis Leslie Rose, Blackley, Manchester, England, assignors to Imperial Chemical Industries Limited, a corporation of Great Britain No Drawing. Application September 1, 1944, Serial No. 552,382. In Great Britain April 6, 1944

2 Claims. (Cl. 260—251)

This invention relates to new pyrimidine compounds and to processes for manufacturing the same. The said new compounds, which will be more closely defined hereinafter, may be described broadly as pyrimidines bearing in the 2-position an arylamino group free from acidic substituents, in the 4-position a hydroxy group and in the 6-position a hydrocarbon radical. They are useful as intermediates in the manufacture of chemotherapeutic agents and particularly of the antimalarial agents of copending applications Serial Nos. 537,536 and 552,383.

It is an object of this invention to provide new pyrimidine compounds. A further object is to provide processes for making the same. A further object is to provide new intermediates for chemotherapeutic agents and processes for making the same. Further objects will appear hereinafter as the description proceeds. These and other objects are achieved by the following invention.

The said new compounds are 4-hydroxy-pyrimidines of the formula

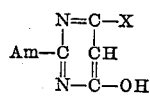

wherein X stands for a hydrocarbon radical and Am stands for an arylamino group which may be unsubstituted or may bear one or more simple non-acidic substituents such, for example, as halogen atoms, nitro groups, hydrocarbon radicals (which themselves may optionally bear simple substituents and which may be attached to the arylamino group directly or through an imino, sulphonyl or carbonyl group), alkoxy groups, alkylmercapto groups, cyano groups or esterified carboxyl groups.

According to the invention we make the said new compounds by a process comprising the interaction of the appropriate arylamine with a 4-hydroxy-pyrimidine substituted in the 6-position by a hydrocarbon radical and in the 2-position by an alkylmercapto or substituted alkylmercapto group.

The reaction is conveniently brought about by heating the reagents together, optionally in the presence of a solvent or diluent, whereupon the alkylmercaptan is eliminated and the new 2-arylamino-4-hydroxy-6-substituted-pyrimidine is formed.

The reagents are not necessarily used in stoichiometric proportions. Frequently when the arylamine concerned is readily available and of suitable melting point we use an excess thereof as a solvent or diluent. In other cases we use a slight excess of the amine (usually 1.2 molecular proportions) together with an inert organic solvent such as $\beta$-ethoxy-ethanol. But these proportions are a matter of convenience; the reaction will go quite satisfactorily with the stoichiometric proportions or in presence of an excess of either reagent.

The starting materials, namely the 4-hydroxypyrimidines bearing in the 6-position a hydrocarbon radical and in the 2-position an alkylmercapto or substituted alkylmercapto group may conveniently be made by interaction of appropriate alkyl isothioureas with formylacetic esters substituted by hydrocarbon radicals on the $\beta$-carbon atom, or by direct S-alkylation of the 6 - substituted - 2 - mercapto - 4 - hydroxypyrimidines, themselves obtained from thiourea and the appropriate formylacetic esters substituted by hydrocarbon radicals on the $\beta$-carbon atom.

As examples of suitable mercapto compound there may be mentioned 2-methylmercapto-4-hydroxy - 6 - methylpyrimidine, 2 - methylmercapto - 4 - hydroxy - 6 - ethylpyrimidine and 2-methylmercapto - 4 - hydroxy - 6 - phenylpyrimidine; also the corresponding 2-ethylmercapto and 2-benzylmercapto compounds may be used.

As examples of suitable arylamines there may be mentioned aniline, o, m- and p-chloroanilines, o- and p-methoxyanilines, o-, m- and p-toluidines, o- and p-bromoanilines, p-methylmercaptoaniline, 2:4-, 3:4- and 2:5-dichloroanilines, 3:4- and 3:5-dimethylanilines, 2-methyl-4-chloroaniline, 3-chloro-4-methylaniline, 3:5-dibromoaniline, 4-dimethylaminoaniline, p-nitroaniline, p-cyanoaniline, p-carbomethoxyaniline, p-ethoxyaniline, p-n-butylaniline, p-phenylaniline, $\alpha$- and $\beta$-naphthylamines, 4-chloro-$\alpha$-naphthylamine, 6-bromo-$\beta$-naphthylamine and 6-methoxy-$\beta$-naphthylamine.

The following examples illustrate but do not limit the invention. The parts are by weight.

Example 1

An intimate mixture of 46.8 parts of 2-methylmercapto-4-hydroxy-6-methylpyrimidine (H. L. Wheeler and H. F. Merriam, Amer. Chem. J., 1903, 29, 475) and 140 parts of p-chloroaniline is heated to 130–135° C. for 48 hours. Methyl mercaptan is evolved and the mixture, which is at first liquid, gradually solidifies. After cooling, the reaction mixture is ground up and boiled with 400 parts of ethanol. It is then allowed to cool and the 2-p-chloroanilino-4-hydroxy-6-methylpyrimidine is filtered off, washed with ethanol and dried at 60–65° C.

By crystallisation from β-ethoxyethanol it can be obtained as colourless thick laminae, M. P. 294° C.

*Example 2*

46.8 parts of 2-methylmercapto-4-hydroxy-6-methylpyrimidine and 92.25 parts of p-anisidine are heated together in 225 parts of boiling β-ethoxyethanol for 48 hours. Methyl mercaptan is evolved. On cooling the product which crystallises out is filtered off and washed with ethyl alcohol. The resulting 2-p-anisidine-4-hydroxy-6-methylpyrimidine is already pure enough for subsequent use in making the antimalarial agents of copending application Ser. No. 552,383 but, if desired, it can be obtained completely pure by crystallisation from β-ethoxyethanol. When pure it melts at 212–213° C.

In a similar manner by using p-phenetidine instead of p-anisidine there is obtained 2-p-ethoxyanilino-4-hydroxy-6-methylpyrimidine. After crystallisation from methanol it has M. P. 187°–189° C.

Similarly from p-bromoaniline there is obtained 2-p-bromoanilino-4-hydroxy-6-methylpyrimidine. After crystallisation from β-ethoxyethanol it has M. P. 284°–286° C.

From p-butylaniline there is obtained 2-p-butylanilino-4-hydroxy-6-methylpyrimidine, which, after crystallisation from β-ethoxyethanol has M. P. 195°–196° C.

From methyl p-aminobenzoate there is obtained 2-p-carbomethoxyanilino-4-hydroxy-6-methylpyrimidine. Crystallised from dimethylformamide it has M. P. 274°–276° C.

From p-phenylaniline there is obtained 2-p-phenylanilino-4-hydroxy-6-methylpyrimidine which crystallised from dimethyl formamide, has M. P. 258°–259° C.

From p-aminobenzonitrile there is obtained 2-p-cyanoanilino-4-hydroxy-6-methylpyrimidine. After crystallisation from dimethyl formamide it has M. P. 330° C.

*Example 3*

An intimate mixture of 46.8 parts of 2-methylmercapto-4-hydroxy-6-methylpyrimidine (H. L. Wheeler and H. F. Merriam, Amer. Chem. J., 1903, 29, 475) and 140 parts of β-naphthylamine is heated to 130–135° C. for 24 hours. Methylmercaptan is evolved. After cooling the reaction mixture is ground up and then boiled with 600 parts of ethanol for 3 hours. It is then allowed to cool and the 2-β-naphthylamino-4-hydroxy-6-methylpyrimidine is filtered off, washed with ethanol and dried at 60–65° C.

By crystallisation from β-ethoxyethanol it can be obtained as colourless needles, M. P. 243–245° C.

In a similar way, by using instead of β-naphthylamine, α-naphthylamine or 4-chloro-α-naphthylamine and heating for 88 hours there is obtained, respectively, 2-α-naphthylamino-4-hydroxy-6-methylpyrimidine of M. P. 256°–257° C. or 2-(4'-chloro-1'-naphthylamino)-4-hydroxy-6-methylpyrimidine of M. P. 298°–301° C.

*Example 4*

A mixture of 23.4 parts of 2-methylmercapto-4-hydroxy-6-methylpyrimidine, 41.6 parts of 6-bromo-2-naphthylamine and 110 parts of β-ethoxyethanol is stirred and heated at 150–160° C. for 60 hours. Methyl mercaptan is evolved and a solid separates out. After cooling, the solid is filtered off and washed, first with β-ethoxyethanol and then with ethanol and is then crystallised from β-ethoxyethanol. 2-(6'-bromo-2'-naphthylamino)-4-hydroxy-6-methylpyrimidine is thus obtained as colourless crystals, M. P. 286–288° C.

*Example 5*

A mixture of 16.6 parts of 2-methylmercapto-4-hydroxy-6-methylpyrimidine, 23 parts of 6-methoxy-2-naphthylamine and 75 parts of β-ethoxyethanol is stirred and heated at 150–160° C. for 70 hours. Methylmercaptan is evolved and a solid separates out. After cooling, the solid is filtered off, washed with ethanol and recrystallised from β-ethoxyethanol. 2-(6'-methoxy-2'-naphthyamino)-4-hydroxy-6-methylpyrimidine is thus obtained as colourless crystals, M. P. 238–239° C.

*Example 6*

32 parts of 2-methylmercapto-4-hydroxy-6-methylpyrimidine and 65 parts of 2:4-dichloraniline are heated together in 75 parts of boiling β-ethoxyethanol for 48 hours. Methyl mercaptan is evolved. On cooling, the product which separates out is filtered off and washed with ethyl alcohol. The resulting 2-(2':4'-dichloranilino)-4-hydroxy-6-methylpyrimidine is already pure enough for subsequent use in making the antimalarial agents of copending application Ser. No. 552,383 but, if desired, it can be obtained completely pure by crystallisation from β-ethoxyethanol. When pure it melts at 278–280° C.

In a similar way, by using 3:4-dichloroaniline instead of 2:4-dichloroaniline there is obtained 2-(3':4'-dichloroanilino)-4-hydroxy-6-methylpyrimidine of M. P. 250°–252° C.

Similarly, from 2:5-dichloroaniline there is obtained 2-(2':5'-dichloroanilino)-4-hydroxy-6-methylpyrimidine of M. P. 244°–246° C.

*Example 7*

31 parts of 2-methylmercapto-4-hydroxy-6-methylpyrimidine and 57 parts of 5-chloro-o-toluidine (i. e. 2-methyl-4-chloroaniline) are heated together in 75 parts of boiling β-ethoxyethanol for 48 hours. Methyl mercaptan is evolved. On cooling, the product which crystallises out is filtered off and washed with ethyl alcohol. The resulting 2-(2'-methyl-4'-chloroanilino)-4-hydroxy-6-methylpyrimidine is already pure enough for subsequent use in making the antimalarial agents of copending application Ser. No. 552,383 but if desired it can be obtained completely pure by crystallisation from β-ethoxyethanol. When pure it melts at 252–254° C.

In a similar manner, by using 3-chloro-4-methylaniline instead of the 2-methyl-4-chloroaniline of the above example, there is obtained 4-hydroxy-2'-(3'-chloro-4'-methylanilino)-6-methylpyrimidine of M. P. 252–254° C.

*Example 8*

A mixture of 23.4 parts of 2-methylmercapto-4-hydroxy-6-methylpyrimidine and 47.9 parts of m-chloroaniline is heated to 130–135° C. for 48 hours and stirred as long as that is feasible. The reaction mixture gradually solidifies during the course of the reaction and methylmercaptan is evolved. After cooling, the reaction mixture is broken up and boiled with 200 parts of ethanol for 2 hours. It is then allowed to cool and the 2-(3'-chloroanilino)-4-hydroxy-6-methylpyrimidine is filtered off, washed with ethanol and dried at 60–65° C. It is sufficiently pure at this stage for subsequent use in making the antimalarial agents of copending application Ser. No. 552,383 but it may, if desired, be obtained quite pure by crystallisation from β-ethoxyethanol whereby it is obtained as colourless needles, M. P. 227–229° C.

In a similar way, by using o-chloroaniline instead of the m-chloroaniline of the above example, there is obtained 4-hydroxy-2-(2'-chloroanilino)-6-methylpyrimidine of M. P. 244–246° C.

Example 9

15.6 parts of 2-methylmercapto-4-hydroxy-6-methylpyrimidine and 20.5 parts of aniline are heated together in 50 parts of boiling β-ethoxyethanol for 48 hours. Methylmercaptan is evolved and some of the product separates from solution during the reaction. The mixture is then cooled and the 2-anilino-4-hydroxy-6-methylpyrimidine is filtered off, washed with ethanol and dried at 60–65° C. After crystallisation from β-ethoxyethanol it has M. P. 244–246° C.

Example 10

32 parts of 2-methylmercapto-4-hydroxy-6-methylpyrimidine and 50 parts of 3:4-dimethylaniline are heated together in 75 parts of boiling β-ethoxyethanol, with stirring, for 48 hours. Methyl mercaptan is evolved. On cooling 2-(3':4'-dimethylanilino)-4-hydroxy-6-methylpyrimidine crystallises out and is filtered off and washed with ethanol. It is already pure enough to be used forthwith in making the antimalarial agents of copending application Ser. No. 552,383 but if desired can be obtained quite pure by crystallisation from β-ethoxyethanol; it then melts at 238–239° C.

In a similar way, by using 3:5-dimethylaniline instead of the 3:4-dimethylaniline of the above example, there is obtained 4-hydroxy-2-(3':5'-dimethylanilino)-6-methylpyrimidine of M. P. 268° C.

Example 11

15.6 parts of 2-methylmercapto-4-hydroxy-6-methylpyrimidine and 30 parts of 3:5-dibromoaniline are heated together in 140 parts of boiling β-ethoxyethanol for 48 hours. Methylmercaptan is evolved. After cooling 2-(3':5'-dibromoanilino)-4-hydroxy-6-methylpyrimidine which has separated out is filtered off. It is purified by boiling with a small quantity of β-ethoxyethanol for about 5 minutes, filtering, washing with ethanol and drying at 60–65° C. It is thereby obtained as practically colourless needles, M. P. 325° C.

Example 12

31.2 parts of 2-methylmercapto-4-hydroxy-6-methylpyrimidine and 61.5 parts of o-anisidine are mixed and heated together at 125–130° C. for 48 hours with occasional stirring. The evolution of methyl mercaptan which at first is brisk is by that time only slight. After cooling, the reaction mixture is ground up and boiled with 200 parts of ethanol for 3 hours. It is then allowed to cool, and the 2-(2'-methoxyanilino)-4-hydroxy-6-methylpyrimidine which has separated out is filtered off, washed with ethanol and dried at 60–65° C. By crystallisation from β-ethoxyethanol it is obtained as colourless needles, M. P. 245–246° C.

Example 13

31 parts of 2-methylmercapto-4-hydroxy-6-methylpyrimidine and 93 parts of o-toluidine are stirred together at 130–135° C. for 48 hours. Methyl mercaptan is evolved and the reaction mixture slowly solidifies. After cooling it is ground up and refluxed for 3 hours with 250 parts of ethyl alcohol. It is then cooled, and the crystals which separate out are filtered off and dried. There is thus obtained 2-(2'-methylanilino)-4-hydroxy-6-methylpyrimidine. It is sufficiently pure to be used forthwith in making the antimalarial agents of copending application Ser. No. 552,383 but if desired may be purified by crystallisation from β-ethoxyethanol. It has M. P. 204° C.

In a similar manner by using m-toluidine instead of the o-toluidine of the above example there is obtained 4-hydroxy-2-(3'-methylanilino)-6-methylpyrimidine of M. P. 212–213° C.

Example 14

32 parts of 2-methylmercapto-4-hydroxy-6-methylpyrimidine and 54.4 parts of p-dimethylaminoaniline are heated together in 100 parts of boiling β-ethoxyethanol for 24 hours. Methyl mercaptan is evolved. On cooling, the product which crystallises out is filtered off and washed with ethanol. The 2-(4'-dimethylaminoanilino)-4-hydroxy-6-methylpyrimidine so obtained is pure enough to be used forthwith in making the antimalarial agents of copending application Ser. No. 552,383 but may, if desired, be obtained quite pure by crystallisation from β-ethoxyethanol. It then has M. P. 240–242° C.

Example 15

An intimate mixture of 8.2 parts of 2-methylmercapto-4-hydroxy-6-phenyl-pyrimidine (Wheeler and Merriam, Am. Chem. J., 1903, 29, 490) and 12 parts of p-chloroaniline are heated together in an oil bath maintained at 130°–140° C. for 6 hours. Methyl mercaptan is evolved and the mixture, which is at first liquid, solidifies. After cooling it is ground up and boiled with 75 parts of ethanol. The mixture is then cooled and the 2-p-chloroanilino-4-hydroxy-6-phenyl-pyrimidine is filtered off, washed with ethanol and dried at 100° C.

By crystallisation from β-ethoxyethanol it can be obtained in colourless needles of M. P. 312°–313° C.

Example 16

An intimate mixture of 31.2 parts of 2-methylmercapto-4-hydroxy-6-methylpyrimidine (H. L. Wheeler and H. F. Merriam, Amer. Chem. J., 1903, 29, 475) and 93.6 parts of p-toluidine is heated to 130–135° C. for 48 hours with stirring as long as that is feasible. Methyl-mercaptan is evolved and the mixture which is at first liquid, gradually solidifies. After cooling, the reaction mixture is ground up and boiled with 400 parts of ethanol. It is then allowed to cool and the 2-p-toluidino-4-hydroxy-6-methylpyrimidine is filtered off, washed with ethanol and dried at 60–65° C.

By crystallisation from β-ethoxyethanol it can be obtained as colourless crystals, M. P. 230° C.

Example 17

31.2 parts of 2-methylmercapto-4-hydroxy-6-methylpyrimidine and 55.6 parts of 4-methylmercaptoaniline are heated together in 75 parts of boiling β-ethoxyethanol for 48 hours. Methyl mercaptan is evolved. On cooling 2-p-methylmercapto-anilino-4-hydroxy-6-methyl-pyrimidine crystallises out and is filtered off, washed with ethyl alcohol and dried. After crystallisation from β-ethoxyethanol it has M. P. 210–212° C.

Example 18

31.2 parts of 2-methylmercapto-4-hydroxy-6-methylpyrimidine and 93 parts of p-nitroaniline are intimately mixed and heated at 140°–150° C. for 48 hours. The mixture, which at first is liquid gradually solidifies. After cooling, the reaction mixture is ground up and boiled with 300 parts of ethanol. The solution is filtered hot and the residue, which is 2-p-nitroanilino-4-hydroxy-6-methylpyrimidine, is washed with ethanol and dried. It may be further purified, if desired, by dissolving it in sodium hydroxide solution and reprecipitating with acetic acid. The melting point is above 300° C.

Whereas the above description and examples illustrate many widely varied embodiments of the invention it will be apparent to one skilled in the art that many other embodiments and variations may be devised without departing from the spirit and scope thereof, and accordingly it is to be understood that the invention is not in any way limited except as defined in the following claims.

We claim:

1. As a new compound, 4-hydroxy-6-methyl-2-(4'-chloroanilino)-pyrimidine, corresponding to the formula

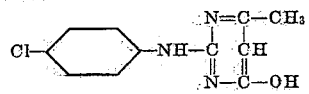

2. A pyrimidine compound corresponding to the formula

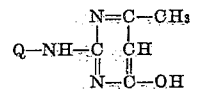

wherein Q is a phenyl radical bearing at least one halogen atom selected from the group consisting of chlorine and bromine.

FRANCIS HENRY SWINDEN CURD.
CLIFFORD GORDON RAISON.
FRANCIS LESLIE ROSE.

REFERENCES CITED

The following references are of record in the file of this patent:

Chemical Reviews, vol. 13, October 1933, No. 2; pp. 246, 226, 248, and 249.